Patented June 23, 1936

2,044,766

UNITED STATES PATENT OFFICE 2,044,766

PROCESS FOR SEPARATING THE VOLATILE LIQUID ORGANIC CONSTITUENTS OF PYROLIGNEOUS ACID

Pierre Berthélemy and François Baylocq, Paris, France, assignors to Société Anonyme Francaise said: Les Produits Chimiques Purs, Paris, France No Drawing. Application June 26, 1931, Serial No. 547,180. In France June 28, 1930

6 Claims. (Cl. 260—122)

A process is known whereby it is possible to catch any volatile solvents, carried in inert gases, this being based on the formation of complexes between the solvents and a third body (hereinafter denominated "auxiliary product"), such complexes being decomposable by heat, the solvent being released on the one hand and the auxiliary product on the other hand, the latter becoming available for further use and thus effecting a closed cycle.

This process is the starting point of the industrial application of complexes. As regards the extraction of solvents, in their pure state, from their aqueous solutions, other processes have been industrially applied but owing to the difficulties of manipulation, the heavy expenditure in apparatus and the high manufacturing costs, their application has not become general.

We have observed that in the presence of water in a liquid state or in the form of vapor, all the solvents miscible with water (alone or in the form of a mixture) are extracted by the formation of a complex which is not miscible with water, with one auxiliary product only or with a mixture of auxiliary products permitting of ready separation by decanting; the selection of the constituent substances entering into the mixture being made either at the time of the decomposition of the complexes or at the time of their recuperation, if the initial mixture is in the vapor state, since the temperatures of decomposition of the complexes are definite and since these complexes may be formed, even separately, at temperatures in the neighborhood of that at which they are decomposed.

As the temperature at which decomposition occurs is a fixed one, volatile products of very high concentration are obtained and in order to obtain them in a pure state it suffices, as a rule, to make them undergo a supplementary treatment by causing them to act on an auxiliary product, either in the liquid phase at any temperature or in the vapor phase, or both in the liquid and vapor phase, in the presence of an auxiliary product, in the course of a simple distillation.

By this method it is quite easy, with a plant which is not costly and manufacturing costs which are not high, to treat the aqueous solutions of solvents (hydro-carbons, alcohols, aldehydes, acetones, acids, ethers etc.) or to extract and fractionate mixtures of solvents, as in the case of pyroligneous substances resulting from the distillation of wood and other vegetable substances in a closed vessel. The method procures really remarkable results when one solvent only is to be treated, for instance the acetic acid contained in the residuary waters obtained from the manufacture of acetates of cellulose or the homologues of acetic acid such as the butyric acid obtained by fermentation or by other processes.

As regards the application of the present process to the extraction of acetic acid, for instance from the residuary waters resulting from the manufacture of acetates of cellulose, the fixation of the acid on the auxiliary product selected may be effected direct from the residuary waters in a liquid state, either under the influence of heat or cold, whatever their concentration may be; it can also be effected on these residuary waters in a state of vapor, the operation being carried out in one stage only or in a number of stages sufficient to ensure the almost complete exhaustion of the said residuary waters.

The acetic acid obtained by the dissociation of the complex which is formed, under these conditions, by the auxiliary product and the acetic acid, is in a condition of great concentration.

As an example, for the extraction of acetic acid from the residuary waters obtained from the manufacture of acetate of cellulose having a content of acid of about thirty per cent, one thousand liters of these residuary waters together with twenty five hundred liters of the auxiliary product, constituted by cresols for instance, are stirred intimately at the room temperature for two or three minutes. The auxiliary product separated by decanting will be found to have extracted from the residuary water almost the total amount of acetic acid it contained. However if desired the decanted water may be treated in a second operation with the same proportion of auxiliary product, in order to extract nearly the whole amount of acid remaining in the decanted water. The auxiliary product, separated in the manner stated may, after having been decanted, be utilized several times to treat new portions of residuary water having an acid content greater than that of the auxiliary product and the operation may be repeated any desired number of times in order to obtain an auxiliary product with as heavy a content of complex as possible. This is, in effect, a methodical exhaustion of the acidity of the residuary waters commencing with an auxiliary product with an acid content which is lower in proportion as the residuary water acidity is lower.

The charged auxiliary product is submitted to distillation in order to recover the acetic acid produced by the splitting of the complex. As the complex is not completely anhydrous, the water which departs first, in the form of vapor, draws off a small proportion of acid which can be quickly recovered by fixing this acid on some auxiliary product either by trickling or by washing.

The residue remaining is the auxiliary product practically free from acetic acid and this auxiliary product may be brought into contact again with new portions of residual waters.

On the other hand the substances obtained by the decomposition of the complexes can also, themselves, be submitted again to one or several treatments by an auxiliary product in order to obtain the said substances in an almost pure and concentrated state without it being necessary to rectify them.

By means of the present process it is possible to recover immediately, and in a state of high concentration, practically the whole quantity of acid contained in these residuary waters without it being necessary to cause the formation of an alkali metal or alkali earth metal acetate.

As the auxiliary product completes a closed cycle without any appreciable loss, it will be obvious that this application of the process is of a highly economical character.

The extraction of the substances homologous with acetic acid is effected in the same manner whatever their degree of concentration may be. However as the solubility of the higher homologues of acetic acid decreases in proportion as their molecular weight increases and owing to the fact that their boiling point rises in proportion as their molecular weight becomes greater, it will be obvious that the extraction of these homologous substances from their aqueous solutions, by means of the auxiliary product above referred to, will become more easy as they become more removed from the first member of the series.

In the case of the extraction of butyric acid the liquid is placed in contact with an auxiliary product in as perfect a manner as possible, for instance with phenolic compounds. The fixing of the acid on the auxiliary product is substantially instantaneous and it suffices to renew the treatment several times in order to recover practically the whole of the acid content. The phase (auxiliary product and butyric acid) is submitted to distillation in order to obtain acid in a high state of concentration on the one hand and on the other hand the auxiliary product which is intact.

As regards butyric acid it should be noted that as its solubility in water is lower than that of acetic acid (on account of its higher molecular weight) its recovery by means of the auxiliary product is rendered far more easy. Moreover the difference between the boiling points of the water and the acid being greater in the case of butyric acid than in the case of acetic acid, the extraction of butyric acid is much easier than the extraction of acetic acid.

The application of this process yields excellent results for the recovery of butyric acid obtained by fermentation and as the process is a direct one it completely does away with passing through the butyrate stage.

If the initial mixture is in a state of vapor the constituent parts of the mixture may be split up by causing the auxiliary product to react at decreasing temperatures, such that, at each of the temperatures considered, only one complex shall be stable and when decomposed will give off the volatile solvent product in a practically pure state.

For convenience we have referred in certain of the claims to the complex body formed by the phenol substance and the volatile solvent as a "molecular association". However, we do not intend to be limited by this terminology to any particular theory as to the nature of the complex formed.

What we claim is:

1. The process of extracting and separating pyroligneous substances resulting from the destructive distillation of vegetable substances which comprises extracting said substances with a phenolic substance having the property of forming with the pyroligneous substances molecular associations that are stable in the presence of water, thereby forming molecular associations of said substances and said phenolic substance that are stable in the presence of water, separating the resulting mixture of molecular associations from the greater part of the residual aqueous solution by decantation, and then separating said substances from one another and from their respective molecular associations by distillation carried on in stages, the temperature in each succeeding stage being so controlled as to insure decomposition of one of said molecular associations but insufficient to decompose those molecular associations requiring a higher temperature for their decomposition.

2. The process for obtaining individually, in a substantially pure state, the volatile liquid organic constituents of pyroligneous acid which comprises adding a phenol to the pyroligneous acid to form molecular associations stable in the presence of the aqueous medium, separating the molecular associations from the aqueous medium, and then heating said associations step by step to temperatures corresponding respectively to their decomposition temperatures to obtain each said volatile liquid organic constituent separately.

3. The process for obtaining individually, in a substantially pure state, the volatile liquid organic constituents of pyroligneous acid which comprises contacting vapors of said acid with a phenol while passing the same through a series of extraction zones maintained at successively decreasing temperatures such that in each zone a single stable molecular association is formed from the phenol and one of said constituents, separating the molecular associations formed as aforesaid from water present in said acid vapors, and heating the separately obtained molecular associations to decompose the same and recover the said individual volatile liquid organic constituents in a substantially pure state.

4. A process of obtaining, in a substantially pure state, a volatile liquid organic constituent of pyroligneous acid which comprises adding a phenol to the pyroligneous acid to form a molecular association stable in the presence of an aqueous medium, separating the molecular association from the aqueous medium, completely eliminating the remaining water retained by or otherwise present with the said association by heating the same at a temperature below its dissociation temperature but at or above the boiling point of water, and finally heating said association to its decomposition temperature, whereby the volatile liquid organic constituent is obtained in a substantially pure state.

5. The process for obtaining individually, in a substantially pure state, the principal volatile liquid organic constituents of pyroligneous acid which comprises adding a phenol to the pyroligneous acid to form molecular associations stable in the presence of the aqueous medium, separating the molecular associations from the bulk of